US012387869B2

(12) United States Patent
Nygren et al.

(10) Patent No.: US 12,387,869 B2
(45) Date of Patent: Aug. 12, 2025

(54) METHOD FOR MANUFACTURING CHOKE COIL, CHOKE COIL AND ELECTRICAL ASSEMBLY COMPRISING THE CHOKE COIL

(71) Applicant: ABB Schweiz AG, Baden (CH)

(72) Inventors: Toni Nygren, Helsinki (FI); Asko Mielonen, Helsinki (FI); Jaani Kärppä, Helsinki (FI)

(73) Assignee: ABB Schweiz AG, Baden (CH)

(*) Notice: Subject to any disclaimer, the term of this patent is extended or adjusted under 35 U.S.C. 154(b) by 791 days.

(21) Appl. No.: 17/656,909

(22) Filed: Mar. 29, 2022

(65) Prior Publication Data

US 2022/0310310 A1 Sep. 29, 2022

(30) Foreign Application Priority Data

Mar. 29, 2021 (EP) .................................... 21165453

(51) Int. Cl.
*H01F 27/29* (2006.01)
*H01F 5/04* (2006.01)
*H01F 41/04* (2006.01)

(52) U.S. Cl.
CPC ............. *H01F 27/292* (2013.01); *H01F 5/04* (2013.01); *H01F 41/04* (2013.01)

(58) Field of Classification Search
CPC ........... H01F 27/292; H01F 5/04; H01F 41/04
See application file for complete search history.

(56) References Cited

U.S. PATENT DOCUMENTS 4,833,437 A * 5/1989 Williamson ............ H01F 37/00 336/83
2016/0293323 A1* 10/2016 Kawashima ........ H01F 27/2828
2020/0234860 A1* 7/2020 Kusuda ..................... H01F 5/00

FOREIGN PATENT DOCUMENTS

JP H0134284 Y2 * 10/1989
JP H09251920 A * 9/1997
JP H10189350 A * 7/1998
JP 2009206421 A 9/2009
JP 2016051866 A * 4/2016

OTHER PUBLICATIONS

European Search Report, Application No. EP 21 16 5453; Issued: Sep. 23, 2021; 2 Pages.

* cited by examiner

*Primary Examiner* — Malcolm Barnes
(74) *Attorney, Agent, or Firm* — Whitmyer IP Group LLC

(57) ABSTRACT

A choke coil including a conductor element having a plurality of coil turns, a first terminal member adapted for electrically connecting the choke coil to a first circuit terminal of an electric circuit, and a second terminal member adapted for electrically connecting the choke coil to a second circuit terminal of the electric circuit. The first terminal member is adapted to compensate lateral dimensional variance between locations of the first circuit terminal and second circuit terminal, and the second terminal member is adapted to compensate longitudinal dimensional variance between locations of the first circuit terminal and second circuit terminal, wherein the lateral dimensional variance is perpendicular to a longitudinal direction of the choke coil extending between the first terminal member and the second terminal member, and the longitudinal dimensional variance is parallel to the longitudinal direction.

18 Claims, 3 Drawing Sheets

METHOD FOR MANUFACTURING CHOKE COIL, CHOKE COIL AND ELECTRICAL ASSEMBLY COMPRISING THE CHOKE COIL

TECHNICAL FIELD

The present invention relates to a method for manufacturing a choke coil, to a choke coil, and to an electrical assembly comprising the choke coil.

BACKGROUND

A known method for manufacturing a choke coil comprises forming a plurality of coil turns to an elongated piece of electrically conducting material, and forming a first terminal member at a first end of the elongated piece, and a second terminal member at a second end of the elongated piece. The first terminal member is adapted for electrically connecting the choke coil to a first circuit terminal of an electric circuit, and the second terminal member is adapted for electrically connecting the choke coil to a second circuit terminal of the electric circuit. Forming the first and second terminal members comprises pressing the ends of the elongated piece of electrically conducting material flat, and machining identical, rectangular apertures to the terminal members.

One of the problems associated with the above mentioned known method is that the method requires several stages, many of which are usually carried out manually. Further, due to the several stages required for manufacturing the choke coil, a dimensional variance between locations of the terminal members is sometimes relatively large.

BRIEF DESCRIPTION OF THE INVENTION

An object of the present invention is to provide a method for manufacturing a choke coil, and a choke coil so as to solve the above problems. The objects of the invention are achieved by a method and a choke coil which are described in the following.

The invention is based on the idea of providing a first terminal member of a choke coil with a first aperture, and a second terminal member of the choke coil with a second aperture such that the first aperture is adapted to compensate lateral dimensional variance between locations of the first circuit terminal and second circuit terminal of the electric circuit, and the second aperture is adapted to compensate longitudinal dimensional variance between locations of the first circuit terminal and second circuit terminal, wherein the lateral dimensional variance is perpendicular to a longitudinal direction of the choke coil, and the longitudinal dimensional variance is parallel to the longitudinal direction.

In the method according to the invention, the first aperture of the first terminal member and the second aperture of the second terminal member are formed by bending the same elongated piece of electrically conducting material of which the plurality of coil turns of the choke coil are formed.

An advantage of the method of the invention is that no machining operations are required for forming the first aperture and second aperture, thereby reducing stages required for manufacturing the choke coil. An advantage of the choke coil of the invention is that both lateral and longitudinal dimensional variances between locations of the first terminal member and the second terminal member, and/or between locations of the first circuit terminal and second circuit terminal can be compensated simply by changing a position of the choke coil.

BRIEF DESCRIPTION OF THE DRAWINGS

In the following the invention will be described in greater detail by means of preferred embodiments with reference to the attached drawings, in which.

DETAILED DESCRIPTION

Figure 1:
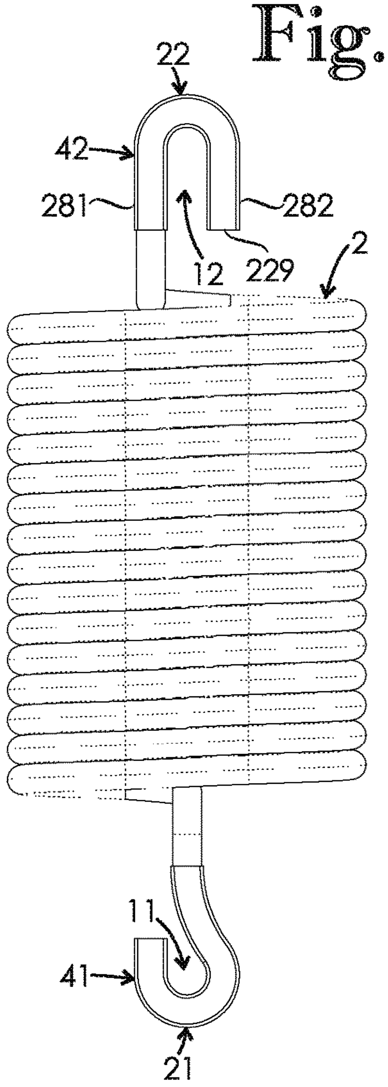
FIGS. 1 to 4 show a choke coil according to an embodiment of the invention from different directions.

FIG. 1 shows a choke coil comprising a conductor element 2, a first terminal member 41, and a second terminal member 42. The conductor element 2 has a first end 21, a second end 22, and a plurality of coil turns between the first end 21 and the second end 22. The first terminal member 41 is provided at the first end 21 of the conductor element 2, and the second terminal member 42 is provided at the second end 22 of the conductor element 2. The first terminal member 41 is adapted for electrically connecting the choke coil to a first circuit terminal of an electric circuit, and the second terminal member 42 is adapted for electrically connecting the choke coil to a second circuit terminal of the electric circuit. The choke coil has a longitudinal direction extending between the first terminal member 41 and the second terminal member 42.

The conductor element 2 is made of copper material, and it is coated with insulating varnish. In an alternative embodiment, the conductor element is made of aluminium material. Herein, copper material is an alloy comprising at least fifty five percent by mass copper, and aluminium material is an alloy comprising at least fifty five percent by mass aluminium. In a further alternative embodiment, the conductor element is made of some other suitable electrically conducting material.

The first terminal member 41 comprises a first aperture 11 extending in a first lateral direction perpendicular to the longitudinal direction, and adapted to receive a first mounting component for electrically connecting the first terminal member 41 to the first circuit terminal of the electric circuit. The second terminal member 42 comprises a second aperture 12 extending in a second lateral direction perpendicular to the longitudinal direction, and adapted to receive a second mounting component for electrically connecting the second terminal member 42 to the second circuit terminal of the electric circuit. In FIG. 1, the longitudinal direction is vertical direction, and both the first lateral direction and the second lateral direction are directions extending perpendicular to the image plane.

Figure 2:
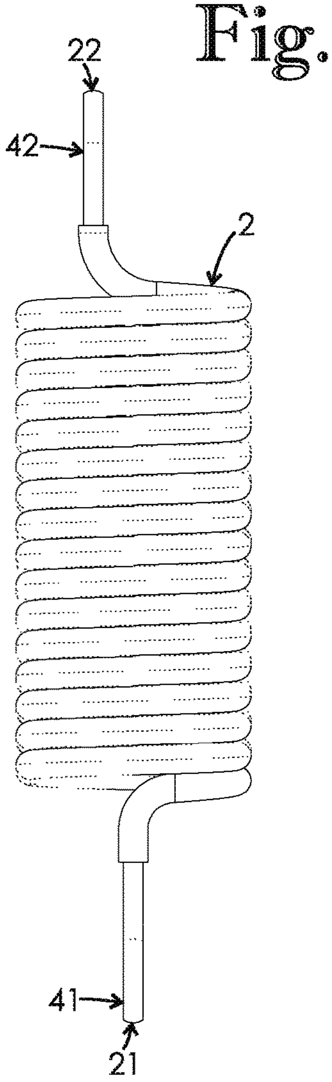
Figure 3:
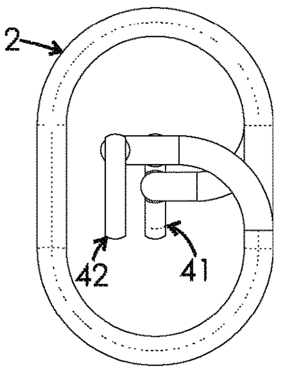

FIG. 2 shows the choke coil of FIG. 1 from a direction perpendicular to the longitudinal direction and first lateral direction. FIG. 3 shows the choke coil of FIG. 1 from a direction parallel to the longitudinal direction. FIG. 3 shows that the plurality of coil turns are oval-shaped. In an alternative embodiment, the plurality of coil turns have a circular shape. In a further alternative embodiment, the plurality of coil turns have generally a rectangular shape.

FIG. 3 shows that on a plane perpendicular to the longitudinal direction, projections of the first terminal member 41 and the second terminal member 42 are located inside a projection of the plurality of coil turns.

The first aperture 11 is defined by a first bent portion of the conductor element 2, and the second aperture 12 is defined by a second bent portion of the conductor element 2. The first aperture 11 has a different shape than the second aperture 12. The first terminal member 41 is adapted to compensate lateral dimensional variance between locations of the first circuit terminal and second circuit terminal, and the second terminal member 42 is adapted to compensate longitudinal dimensional variance between locations of the first circuit terminal and second circuit terminal. The lateral dimensional variance is perpendicular to the longitudinal direction and first lateral direction. The longitudinal dimensional variance is parallel to the longitudinal direction.

In the plurality of coil turns, the conductor element 2 has a circular cross section. In an alternative embodiment, a cross section of the conductor element has a different shape in the plurality of coil turns.

Figure 4:
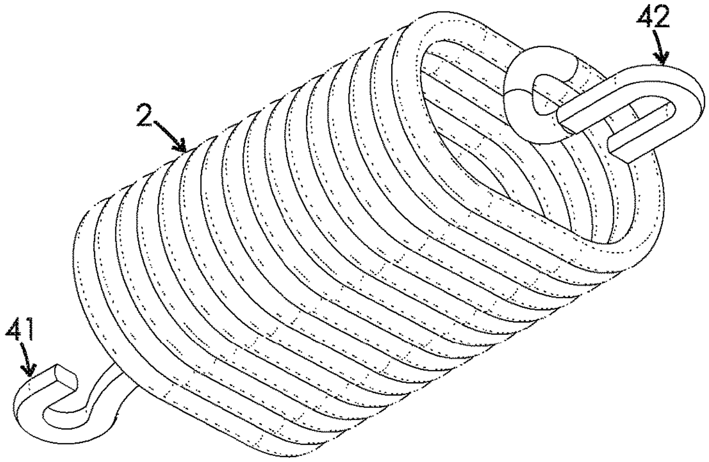

Each of the first terminal member 41 and second terminal member 42 has a flattened cross section such that the first terminal member 41 comprises a first planar contact surface and a second planar contact surface whose normals are mutually opposite and parallel to the first lateral direction, and the second terminal member 42 comprises a first planar contact surface and a second planar contact surface whose normals are mutually opposite and parallel to the second lateral direction. The flattened cross sections of the first terminal member 41 and second terminal member 42 are best seen in FIG. 4, which shows the choke coil of FIG. 1 from a direction oblique to the longitudinal direction and first lateral direction.

The first aperture 11 is adapted to provide a pivot point for the choke coil for rotation around a centre axis of the first aperture 11. The second aperture 12 is an adjustment slot whose dimension in the longitudinal direction is greater than in a direction perpendicular to both the longitudinal direction and the second lateral direction.

Figure 5:
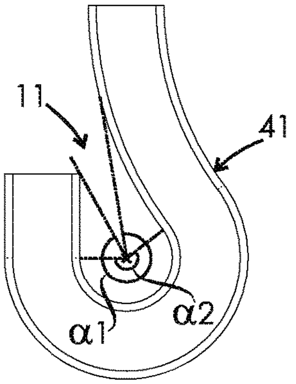
FIG. 5 shows an enlargement of a first terminal member of the choke coil of FIG. 1.

FIG. 5 shows an enlargement of the first terminal member 41. FIG. 5 shows that the first bent portion of the conductor element 2 surrounds a centre axis of the first aperture 11 in a first angle $\alpha 1$ which is approximately 340°. In an alternative embodiment, the first angle is greater than 200°. The first bent portion of the conductor element 2 has a first arch portion which has a form of a circular arch, and subtends a second angle $\alpha 2$ which is approximately 220°. In an alternative embodiment, the second angle is greater than or equal to 180°.

The second bent portion of the conductor element 2 comprises a U-shaped section whose branches 281 and 282 are parallel to the longitudinal direction such that a free end 229 of the U-shaped section is directed generally towards the first terminal member 41. The U-shaped section provides the adjustment slot of the second terminal member 42.

In an embodiment, the first aperture is defined by a first bent portion of the conductor element, and the second aperture is defined by a second bent portion of the conductor element such that each of the first bent portion and second bent portion comprises a U-shaped section. Branches of the U-shaped section of the first bent portion are perpendicular to the longitudinal direction. Branches of the U-shaped section of the second bent portion are parallel to the longitudinal direction.

In an alternative embodiment, the first aperture is defined by a first bent portion of the conductor element, and the second aperture is defined by a second bent portion of the conductor element such that each of the first bent portion and second bent portion comprises a U-shaped section. Both branches of the U-shaped section of the first bent portion and branches of the U-shaped section of the second bent portion are parallel to the longitudinal direction. Functionality of this alternative embodiment corresponds roughly to the choke coil of FIG. 1. However, it should be noted that the first aperture 11 of the choke coil of FIG. 1 provides a better pivot point for the choke coil for rotation since co-operation with a loosened first mounting component and the first aperture 11 does not allow movement between the first terminal member 41 and the first circuit terminal in any direction perpendicular to the first lateral direction. This feature simplifies assembling of the electrical assembly.

Figure 6:
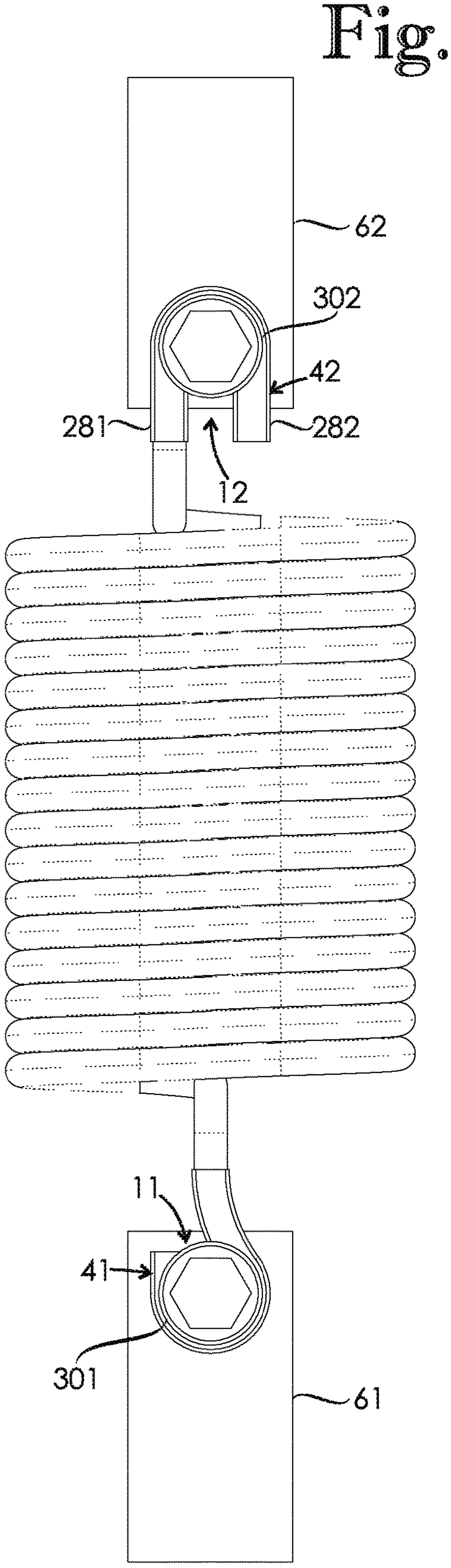
FIG. 6 shows an electrical assembly comprising the choke coil of FIG. 1.

FIG. 6 shows an electrical assembly comprising a first circuit terminal 61, a second circuit terminal 62, a first mounting component 301, a second mounting component 302, and the choke coil of FIG. 1. The first terminal member 41 is electrically connected to the first circuit terminal 61 by means of the first mounting component 301 extending through the first aperture 11. The second terminal member 42 is electrically connected to the second circuit terminal 62 by means of the second mounting component 302 extending through the second aperture 12.

The first mounting component 301 is a bolt whose bolt head presses the first terminal member 41 against the first circuit terminal 61. The second mounting component 302 is a bolt whose bolt head presses the second terminal member 42 against the second circuit terminal 62. The electrical assembly comprises internal threads adapted to co-operate with external threads of the first mounting component 301 and the second mounting component 302. In an embodiment, the internal threads are in nuts located on opposite side of the circuit terminals than the bolt heads. In an alternative embodiment, the internal threads are formed in the circuit terminals.

Figure 7:
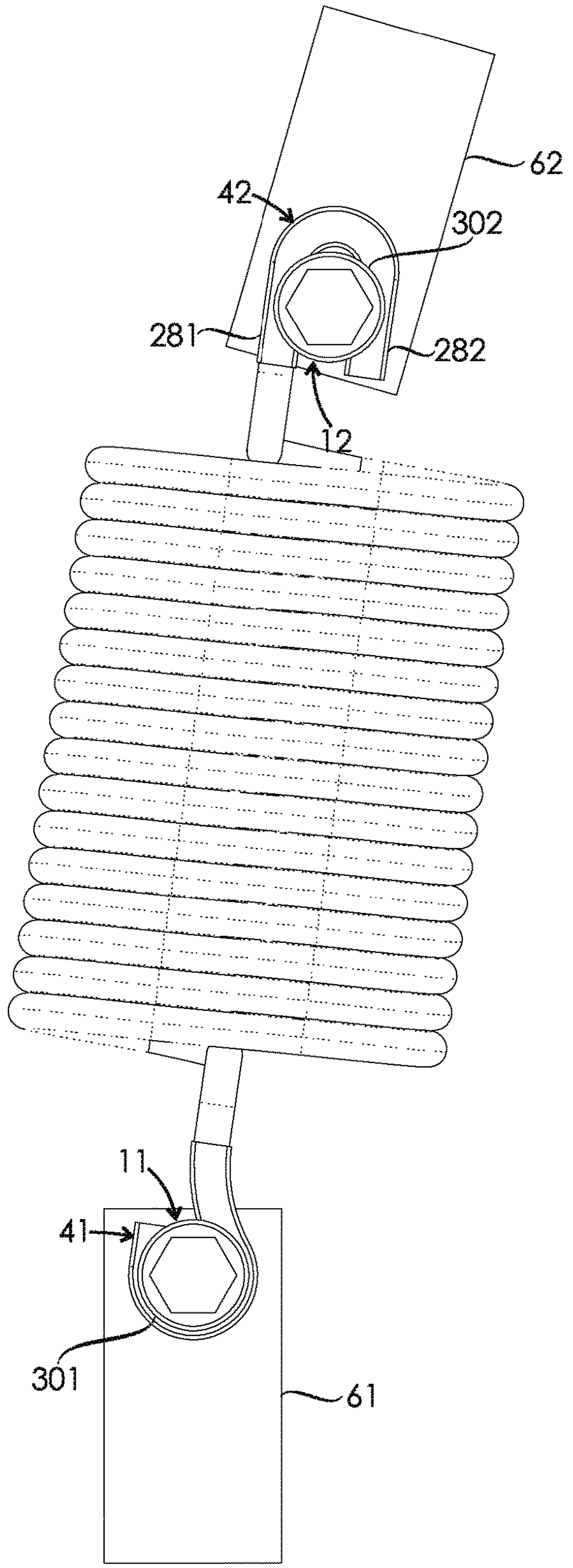
FIG. 7 shows the electrical assembly of FIG. 6 in a situation where a mutual location between a first circuit terminal and second circuit terminal of the electrical assembly has been changed in order to illustrate dimensional variance between locations of the first circuit terminal and second circuit terminal.

FIG. 7 shows the electrical assembly of FIG. 6 in a situation where a mutual location between the first circuit terminal 61 and second circuit terminal 62 has been changed in order to illustrate dimensional variance between locations of the first circuit terminal and second circuit terminal. In FIG. 7, the first circuit terminal 61 has been moved relative to the second circuit terminal 62 in two directions. The first circuit terminal 61 has been moved relative to the second circuit terminal 62 in a direction parallel to the longitudinal direction such that the second circuit terminal 62 is closer to the first circuit terminal 61 than in FIG. 6. Herein, that is a longitudinal dimensional variance. Further, first circuit terminal 61 has been moved relative to the second circuit terminal 62 in a direction perpendicular to both the longitudinal direction and first lateral direction. Herein, that is a lateral dimensional variance.

FIG. 7 shows that the lateral dimensional variance has been compensated by rotating the choke coil around the centre axis of the first aperture 11. Rotating the choke coil around the pivot point provided by the first aperture 11 is possible when the first mounting component 301 is sufficiently loosened. The first terminal member 41 cannot disengage from the first mounting component 301 due to dimensions of the first mounting component 301. A diameter of the bolt head of the first mounting component 301 is so large that the bolt head does not fit through the first aperture 11. A diameter of a shank of the first mounting component 301 has been selected such that it is not possible to disengage the first mounting component 301 from the first aperture 11 in a direction perpendicular to the first lateral direction. Further, the diameter of the shank of the first mounting component 301 has been selected such that there is only little play between the shank and the first aperture 11.

FIG. 7 further shows that the longitudinal dimensional variance has been compensated by sliding the second mounting component 302 in the adjustment slot of the second terminal member 42 in a direction away from a bottom of the U-shaped section of the second terminal member 42.

Figure 8:
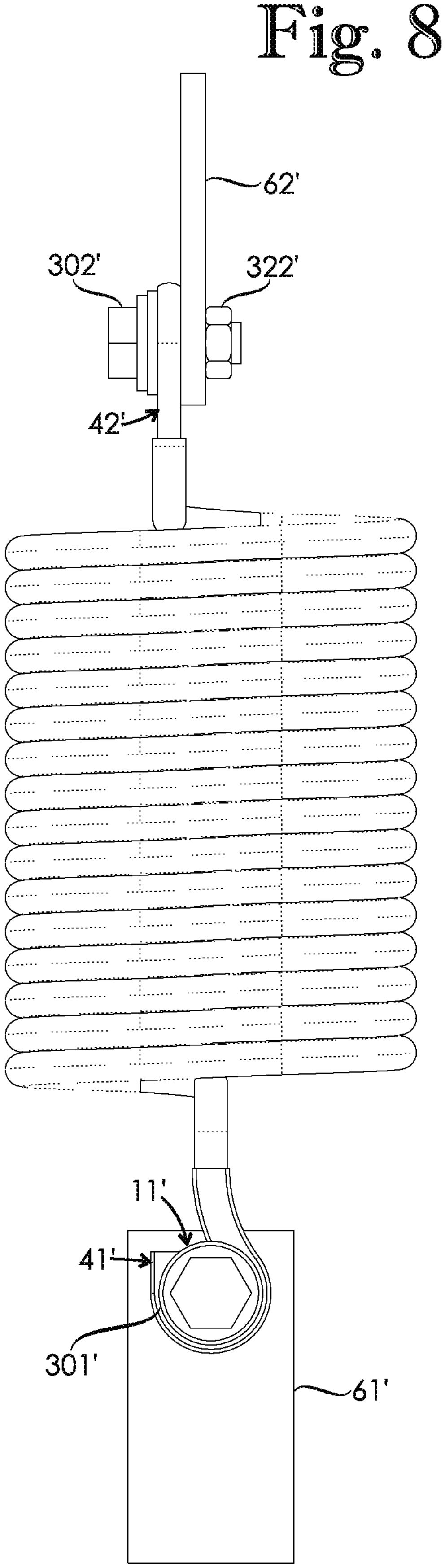
FIG. 8 shows an electrical assembly comprising a choke coil according to an alternative embodiment of the invention.

FIG. 8 shows an electrical assembly comprising a choke coil according to an alternative embodiment of the invention. The choke coil of FIG. 8 differs from the choke coil of FIG. 1 in that the second terminal member 42' has been bent by 90° relative to the first terminal member 41' around the longitudinal direction such that the second lateral direction, in which the second aperture extends, is perpendicular to both the longitudinal direction and first lateral direction. Otherwise, the electrical assembly of FIG. 8 is similar to the electrical assembly of FIG. 6.

In FIG. 8, the electrical assembly is shown from a direction parallel to the first lateral direction. The second lateral direction is a horizontal direction. Due to the position of the second terminal member 42', a nut 322' whose internal thread co-operates with external threat of the second mounting component 302' is visible.

Figure 9:
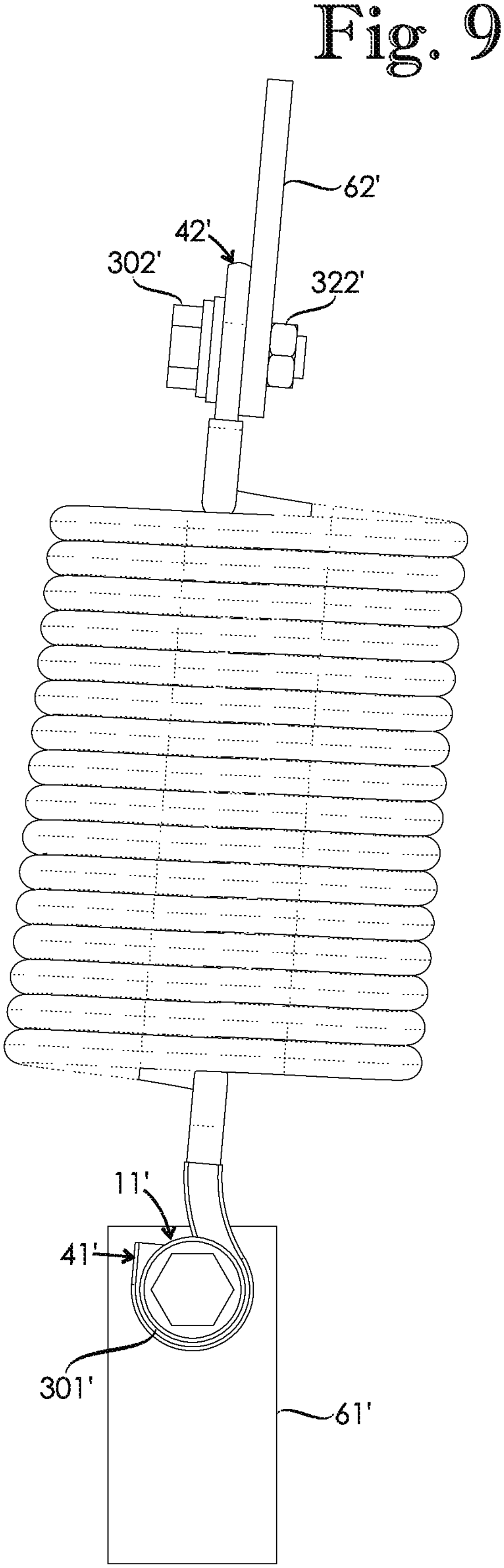
FIG. 9 shows the electrical assembly of FIG. 8 in a situation where a mutual location between a first circuit terminal and second circuit terminal of the electrical assembly has been changed in order to illustrate dimensional variance between locations of the first circuit terminal and second circuit terminal.

FIG. 9 shows the electrical assembly of FIG. 8 in a situation where a mutual location between the first circuit terminal 61' and second circuit terminal 62' has been changed in order to illustrate dimensional variance between locations of the first circuit terminal and second circuit terminal. In FIG. 9, the first circuit terminal 61' has been moved relative to the second circuit terminal 62' in two directions which are identical to the directions in which the first circuit terminal 61 is moved between FIGS. 6 and 7.

The choke coil of FIG. 1 can be manufactured by a method comprising providing an elongated piece of electrically conducting material, forming the plurality of coil turns to the elongated piece of electrically conducting material, forming the first terminal member 41 to the elongated piece of electrically conducting material, and forming the second terminal member 42 to the elongated piece of electrically conducting material. The forming of the first terminal member 41 comprises forming the first aperture 11 by bending the elongated piece of electrically conducting material, and the forming of the second terminal member 42 comprises forming the second aperture 12 by bending the elongated piece of electrically conducting material.

In an embodiment, the forming of the first aperture and the second aperture by bending the elongated piece of electrically conducting material, and the forming of the plurality of coil turns to the elongated piece of electrically conducting material are carried out with a coiling and bending machine. It is known to use such a machine for manufacturing steel springs. A coiling and bending machine is well suited for shaping an elongated piece having a circular cross section.

When a coiling and bending machine is used for manufacturing a choke coil according to the invention, it is in many cases advantageous to form one of the first aperture and the second aperture by bending the elongated piece of electrically conducting material prior to forming the plurality of coil turns to the elongated piece of electrically conducting material. In an embodiment, the elongated piece of electrically conducting material is coated with insulating material such as insulating varnish prior to the forming of the plurality of coil turns and the first and second terminal members.

The method for manufacturing the choke coil of FIG. 1 further comprises flattening the first terminal member 41 and the second terminal member 42 such that each of them has a flattened cross section. In an embodiment, the flattening of the first terminal member and the second terminal member is carried out subsequent to coiling the plurality of coil turns and forming of the first and second apertures.

In an embodiment, the coiling and bending machine comprises a controller, a plurality of sensors and a computer vision system. The controller is adapted to control coiling and bending of the elongated piece of electrically conducting material, and to receive information from the plurality of sensors and the computer vision system. The plurality of sensors comprises at least one sensor adapted for monitoring hardness of the elongated piece of electrically conducting material. By means of information received from the plurality of sensors and the computer vision system, the controller is capable of ensuring that dimensions and locations of the first aperture and second aperture are accurate.

It will be obvious to a person skilled in the art that the inventive concept can be implemented in various ways. The invention and its embodiments are not limited to the examples described above but may vary within the scope of the claims.

The invention claimed is:

1. A method for manufacturing a choke coil, the method comprising:

providing an elongated piece of electrically conducting material;

forming a plurality of coil turns to the elongated piece of electrically conducting material;

forming a first terminal member to the elongated piece of electrically conducting material, the first terminal member being spaced apart from the plurality of coil turns, and adapted for electrically connecting the choke coil to a first circuit terminal of an electric circuit;

forming a second terminal member to the elongated piece of electrically conducting material, the second terminal member being spaced apart from the plurality of coil turns, and adapted for electrically connecting the choke coil to a second circuit terminal of the electric circuit, wherein the choke coil has a longitudinal direction extending between the first terminal member and the second terminal member, and the plurality of coil turns are located between the first terminal member and the second terminal member, wherein the forming of the first terminal member comprises forming a first aperture by bending the elongated piece of electrically conducting material, and the forming of the second terminal member comprises forming a second aperture by bending the elongated piece of electrically conducting material, wherein the first terminal member is adapted to compensate lateral dimensional variance between locations of the first circuit terminal and second circuit terminal, and the second terminal member is adapted to compensate longitudinal dimensional variance between locations of the first circuit terminal and second circuit terminal, wherein the lateral dimensional variance is perpendicular to the longitudinal direction, and the longitudinal dimensional variance is parallel to the longitudinal direction.

2. The method according to claim 1, wherein forming of one of the first aperture and the second aperture by bending the elongated piece of electrically conducting material is carried out prior to forming the plurality of coil turns to the elongated piece of electrically conducting material.

3. The method according to claim 2, wherein the first aperture extends in a first lateral direction perpendicular to the longitudinal direction, and the second aperture extends in a second lateral direction perpendicular to the longitudinal direction.

4. The method according to claim 1, wherein the first aperture extends in a first lateral direction perpendicular to the longitudinal direction, and the second aperture extends in a second lateral direction perpendicular to the longitudinal direction.

5. The method according to claim 1, wherein the method comprises flattening the first terminal member and the second terminal member such that each of them has a flattened cross section, wherein the first terminal member comprises a first planar contact surface and a second planar contact surface whose normals are mutually opposite, and the second terminal member comprises a first planar contact surface and a second planar contact surface whose normals are mutually opposite.

6. The method according to claim 1, wherein the forming of the first aperture and the second aperture by bending the elongated piece of electrically conducting material, and the forming of the plurality of coil turns to the elongated piece of electrically conducting material are carried out with a coiling and bending machine.

7. A choke coil comprising:

a conductor element having a first end and a second end, and made of electrically conducting material, the conductor element comprising a plurality of coil turns between the first end and the second end;

a first terminal member provided at the first end of the conductor element; and a second terminal member provided at the second end of the conductor element, wherein the first terminal member is adapted for electrically connecting the choke coil to a first circuit terminal of an electric circuit, and the second terminal member is adapted for electrically connecting the choke coil to a second circuit terminal of the electric circuit, and the choke coil has a longitudinal direction extending between the first terminal member and the second terminal member, the first terminal member comprises a first aperture extending in a first lateral direction perpendicular to the longitudinal direction, and adapted to receive a first mounting component for electrically connecting the first terminal member to the first circuit terminal of the electric circuit, and the second terminal member comprises a second aperture extending in a second lateral direction perpendicular to the longitudinal direction, and adapted to receive a second mounting component for electrically connecting the second terminal member to the second circuit terminal of the electric circuit, wherein the first terminal member is adapted to compensate lateral dimensional variance between locations of the first circuit terminal and second circuit terminal, and the second terminal member is adapted to compensate longitudinal dimensional variance between locations of the first circuit terminal and second circuit terminal, wherein the lateral dimensional variance is perpendicular to the longitudinal direction, and the longitudinal dimensional variance is parallel to the longitudinal direction.

8. The choke coil according to claim 7, wherein the first aperture is adapted to provide a pivot point for the choke coil for rotation around a centre axis of the first aperture, and the second aperture is an adjustment slot whose dimension in the longitudinal direction is greater than in a direction perpendicular to both the longitudinal direction and the second lateral direction.

9. The choke coil according to claim 8, wherein the first aperture is defined by a first bent portion of the conductor element, and the second aperture is defined by a second bent portion of the conductor element.

10. The choke coil according to claim 7, wherein the first aperture is defined by a first bent portion of the conductor element, and the second aperture is defined by a second bent portion of the conductor element.

11. The choke coil according to claim 10, wherein the first bent portion of the conductor element surrounds a centre axis of the first aperture in a first angle which is greater than 200°.

12. The choke coil according to claim 11, wherein the first bent portion of the conductor element has a first arch portion which has a form of a circular arch, and subtends a second angle which is greater than or equal to 180°.

13. The choke coil according to claim 10, wherein the first bent portion of the conductor element has a first arch portion which has a form of a circular arch, and subtends a second angle which is greater than or equal to 180°.

14. The choke coil according to claim 10, wherein the second bent portion of the conductor element comprises a U-shaped section whose branches are parallel to the longitudinal direction such that a free end of the U-shaped section is directed generally towards the first terminal member.

15. The choke coil according to claim 7, wherein each of the plurality of coil turns of the conductor element has a circular cross section.

16. The choke coil according to claim 7, wherein each of the first terminal member and second terminal member has a flattened cross section such that the first terminal member comprises a first planar contact surface and a second planar contact surface whose normals are mutually opposite and parallel to the first lateral direction, and the second terminal member comprises a first planar contact surface and a second planar contact surface whose normals are mutually opposite and parallel to the second lateral direction.

17. The choke coil according to claim 7, wherein the conductor element is made of copper material or aluminium material.

18. An electrical assembly comprising:

a first circuit terminal;

a second circuit terminal;

a first mounting component;

a second mounting component; and a choke coil including;

a conductor element having a first end and a second end, and made of electrically conducting material, the conductor element comprising a plurality of coil turns between the first end and the second end;

a first terminal member provided at the first end of the conductor element; and a second terminal member provided at the second end of the conductor element, wherein the first terminal member is adapted for electrically connecting the choke coil to the first circuit terminal of an electric circuit, and the second terminal member is adapted for electrically connecting the choke coil to the second circuit terminal of the electric circuit, and the choke coil has a longitudinal direction extending between the first terminal member and the second terminal member, the first terminal member comprises a first aperture extending in a first lateral direction perpendicular to the longitudinal direction, and adapted to receive a first mounting component for electrically connecting the first terminal member to the first circuit terminal of the electric circuit, and the second terminal member comprises a second aperture extending is a second lateral direction perpendicular to the longitudinal direction, and adapted to receive a second mounting component for electrically connecting the second terminal member to the second circuit terminal of the electric circuit, wherein the first terminal member is adapted to compensate lateral dimensional variance between locations of the first circuit terminal and second circuit terminal, and the second terminal member is adapted to compensate longitudinal dimensional variance between locations of the first circuit terminal and second circuit terminal, wherein the lateral dimensional variance is perpendicular to the longitudinal direction, and the longitudinal dimensional variance is parallel to the longitudinal direction; and wherein the first terminal member is electrically connected to the first circuit terminal by means of the first mounting component extending through the first aperture, and the second terminal member is electrically connected to the second circuit terminal by means of the second mounting component extending through the second aperture.

* * * * *